United States Patent
Chen

(10) Patent No.: US 11,632,348 B2
(45) Date of Patent: *Apr. 18, 2023

(54) METHOD FOR ACQUIRING MAIL BOX ACCOUNT IN SYSTEM

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

( * ) Notice: Subject to any disclaimer, the term of this patent is extended or adjusted under 35 U.S.C. 154(b) by 243 days.

This patent is subject to a terminal disclaimer.

(21) Appl. No.: 16/634,551

(22) PCT Filed: Jul. 27, 2018

(86) PCT No.: PCT/CN2018/097677
§ 371 (c)(1),
(2) Date: Jan. 27, 2020

(87) PCT Pub. No.: WO2019/020119
PCT Pub. Date: Jan. 31, 2019

(65) Prior Publication Data
US 2020/0267108 A1    Aug. 20, 2020

(30) Foreign Application Priority Data

Jul. 28, 2017    (CN) .......................... 201710633372.1

(51) Int. Cl.
*H04L 51/42*    (2022.01)
*G06F 21/62*    (2013.01)
(Continued)

(52) U.S. Cl.
CPC .......... *H04L 51/42* (2022.05); *G06F 21/6209* (2013.01); *G06Q 10/107* (2013.01); *H04L 63/102* (2013.01); *G06F 2221/2141* (2013.01)

(58) Field of Classification Search
CPC .... G06F 16/27; G06F 21/6218; G06F 3/0482; H04L 63/102; H04L 63/104
See application file for complete search history.

(56) References Cited

U.S. PATENT DOCUMENTS

| 6,947,989 B2 * | 9/2005 | Gullotta | G06F 21/6218 |
| | | | 379/201.12 |
| 11,146,525 B2 * | 10/2021 | Chen | G06F 21/60 |

(Continued)

FOREIGN PATENT DOCUMENTS

| CN | 103001803 A | 3/2013 |
| CN | 104052715 A | 9/2014 |

(Continued)

OTHER PUBLICATIONS

International Search Report in the international application No. PCT/CN2018/097677, dated Nov. 5, 2018.

(Continued)

*Primary Examiner* — Matthew Smithers
*Assistant Examiner* — Shu Chun Gao
(74) *Attorney, Agent, or Firm* — Ladas & Parry, LLP

(57) ABSTRACT

A method for a user/an employee in a system to acquire an email account is disclosed in the present invention, including: relating a role-nature email account to a role according to work content of the role in the system, wherein during the same period, one role can only be related to one role-nature email account, and one role-nature email account can only be related to one role; said role is an independent individual not a group/a class, and during the same period, one role can only be related to a unique user, while one user is related to (Continued)

Relate a role-nature email account to a role according to work content of the role in a system Create a relation between a user and a role, where for any user, role-nature email accounts related to all roles related to the user are used as role-nature email accounts of the user and/or an employee corresponding to the user one or more roles; and creating a relation between a user and a role, wherein for any user, a role-nature email accounts related to all roles related to said user are used as role-nature email accounts of the user and/or an employee corresponding to the user. According to the present invention, a corresponding role-nature email account is allocated to an employee while a post is allocated to the employee, such that it is unnecessary to allocate the role-nature email account to the employee separately, thereby reducing the workload of email account allocation.

10 Claims, 3 Drawing Sheets

(51) Int. Cl.
  *G06Q 10/107* (2023.01)
  *H04L 9/40* (2022.01)

(56) References Cited

U.S. PATENT DOCUMENTS

| | | | | |
|---|---|---|---|---|
| 2002/0147801 A1* | 10/2002 | Gullotta | ............. | H04L 41/0806 379/201.12 |
| 2004/0083367 A1* | 4/2004 | Garg | ................. | G06F 21/6218 713/170 |
| 2005/0080851 A1* | 4/2005 | Kent, Jr. | ............. | G06Q 10/107 709/205 |
| 2007/0035763 A1* | 2/2007 | Bard | ................... | G06F 3/1267 358/1.15 |
| 2009/0125600 A1 | 5/2009 | Fitzpatrick et al. | | |
| 2014/0007222 A1* | 1/2014 | Qureshi | ................. | H04L 67/10 726/16 |
| 2016/0191671 A1* | 6/2016 | Dawson | ................ | G06F 3/0482 715/753 |
| 2020/0304440 A1* | 9/2020 | Chen | ....................... | G06F 21/60 |

FOREIGN PATENT DOCUMENTS

| | | |
|---|---|---|
| CN | 107451792 A | 12/2017 |
| CN | 107465672 A | 12/2017 |
| CN | 107527392 A | 12/2017 |

OTHER PUBLICATIONS

Written Opinion of the International Searching Authority in the international application No. PCT/CN2018/097677, dated Nov. 5, 2018 with English translation provided by Google Translate.
First Office Action and search report from CN app. No. 201810847308. 8, dated May 6, 2019, with English translation from Global Dossier.
Second Office Action and supplemental search report from CN app. No. 20181847308.8, dated Jan. 6, 2020, with English translation from Global Dossier.
International Preliminary Report on Patentability from PCT/CN2018/ 097677, dated Nov. 10, 2019, with English translation from Global Dossier.
Notice of Allowance from Chinese Patent Application No. 201810847308.8 dated Dec. 2, 2020 with English translation.
Decision of Rejection from Chinese Patent Application No. 201810847308.8 dated Apr. 28, 2020 with English translation.

* cited by examiner

METHOD FOR ACQUIRING MAIL BOX ACCOUNT IN SYSTEM

CROSS-REFERENCE TO RELATED APPLICATIONS

This application is the U.S. national phase of PCT/CN2018/097677 filed on Jul. 27, 2018, which claims priority to Chinese Application No. 201710633372.1 filed on Jul. 28, 2017, the disclosures of which are incorporated by reference herein in their entireties.

BACKGROUND

Technical Field

The present invention relates to a method for managing email accounts in a management software system such as an ERP, and in particular, to a method for a user/an employee in a system to acquire an email account.

Related Art

Role-based access control (RBAC) is one of the most researched and mature permission management mechanisms for databases in recent years. It is considered to be an ideal candidate to replace conventional mandatory access control (MAC) and discretionary access control (DAC). The basic idea of role-based access control (RBAC) is to divide different roles according to different functional positions in the enterprise organization view, encapsulate the access permission of database resources in roles, and allow users to indirectly access database resources by assigning different roles to the users.

A large number of tables and views are often built in large-scale application systems, which makes the management and permissions of database resources very complicated. It is very difficult for a user to directly manage the access and permissions of the database resources. It requires the user to have a very thorough understanding of the database structure and to be familiar with the use of the SQL language. Once the application system structure or security requirements have changed, a large number of complex and cumbersome permission changes are required, and the security vulnerabilities caused by unexpected authorization errors are very likely to occur. Therefore, designing a simple and efficient permission management method for large-scale application systems has become a common requirement for systems and system users.

The role-based permission control mechanism can manage the access permissions of the system simply and efficiently, which greatly reduces the burden and cost of the permission management of the system, and makes the permission management of the system more compliant with the business management specifications of the application system.

However, the conventional role-based user permission management method adopts the "role-to-user one-to-many" relation mechanism, where the "role" has the nature of a group/a class. That is, one role can simultaneously correspond to/be related to multiple users, and the role is similar to a post/a position/a type of work or other concepts. The permission authorization to a user under this relation mechanism is basically divided into the following three forms: 1. As shown in FIG. 1, the permission is directly authorized to the user, where the disadvantage is that the workload is large and the operation is frequent and cumbersome. 2. As shown in FIG. 2, the role (having the nature of a class/a group/a post/a type of work) is authorized (one role may be related to multiple users), and the user obtains permissions through its role. 3. As shown in FIG. 3, the above two forms are combined.

In the above descriptions, as both 2 and 3 need to authorize the role that has the nature of a class/a group. The way of authorization through the role having the nature of a class/a group/a post/a type of work has the following disadvantages: 1. Operations are difficult when the user's permission has changed. In the actual process of using a system, the user's permissions often need to be adjusted during the operation process. For example, in processing the change of employee's permissions, when the permissions of the employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in the loss to the system user.

2. It is difficult to remember the specific permissions contained in a role for a long time. If the role has many permission function points, as time goes by, it is difficult to remember the specific permissions of the role, and it is even more difficult to remember the permission differences between roles with similar permissions. If a new user needs to be related, it is impracticable to accurately determine how to select a relation.

3. Because user's permissions change, more roles will be created (if new roles are not created, direct authorization to the user will be increased greatly), and it is more difficult to distinguish specific differences between permissions of the roles.

4. When a user is transferred from a post, if many permissions of the transferred user need to be assigned to other users, it is necessary to distinguish the permissions of the transferred user and create roles to be related to the other users respectively during the processing. Such operations are not only complicated and time-consuming, but also prone to errors.

Currently, emails are of an important communication tool for companies, organizations, and the like, and the development of many tasks relies on emails. However, the existing email management methods have the following disadvantages: First, one email account is allocated to multiple employees, resulting in information leakage. For example, an email account is allocated to a salesperson A, a salesperson B, and a salesperson C. Consequently, the salesperson A can view the email information exchanged by the salesperson B and the salesperson C with their customers, which leads to information leakage of the salesperson B and the salesperson C.

Secondly, an email account is used by different employees consecutively, which leads to information leakage. For example, an email account A that contains plenty of confidential research and development information is first allocated to an employee A in a research and development department, and is then allocated to an employee B in a sales department after the employee A resigns, and therefore, the employee B can view the original confidential research and development information in the email account A.

Thirdly, an employee registers an email account for handling work of the company. After resigning, the employee is unwilling to relinquish the email account because it contains private sensitive information. However, the email account also contains company information, resulting in information leakage.

Fourthly, an email sender is reluctant to send emails to an email address whose user keeps changing, because that makes it very easy to leak confidential information. For example, an employee is late for work but his/her supervisor refrains from deducting wages of the employee A in view of good business results of the employee A, and the supervisor explains this by sending an email to the employee A. If the email account of the employee A is later used by others, this email will be disclosed to others, which is not conducive to the management of the company.

Fifthly, whenever an employee is recruited or transferred from a post, an email account has to be related to the employee (such method of manually relating an email account to an employee has obvious disadvantages: in the long-term process of repeated relating, the work scope of the employee tends to be sharply different from or even mismatched that of the corresponding email account, but the email account has been put into use or even used in a long period, which will cause gross perplexities and troubles to subsequent work and inestimable losses), which involves heavy workloads. Moreover, some hysteresis exists in re-relating the email account to the employee, and will affect the normal progress of the relevant work. For example, when an employee A is transferred from a position as a production supervisor to a position as a sales supervisor, after the existing email account of the employee A is handed over to his/her successor, if the employee A is not related to a new email account, the employee A will not be able to carry out the corresponding work for lack of an email account. If the existing email account of the employee A is not handed over to his/her successor, the successor will not be able to learn relevant historical email information, which is unfavorable to the progress of the work. For another example, an employee A who serves as both a production supervisor and an after-sales supervisor is now disengaged from the position as the production supervisor (the email account of the employee A is not suitable for handover to his/her successor because it contains the emails about the work of the after-sales supervisor). If a new email account is re-allocated to the successor of the production supervisor, the persons concerned (such as equipment maintenance personnel, and outsourced manufacturers) need to be notified. This not only involves a heavy workload but also imposes additional work to the opposing party. In addition, the employee A may still view subsequent production-related emails (for example, in the case that the sender of the emails is unaware of the disengagement of the employee A from the position as the production supervisor). For another example, when the employee A is transferred from the position as the production supervisor to the position as the sales supervisor, if no new email account is allocated to the employee A immediately after the existing email account of the employee A is handed over to his/her successor, the employee A will be unable to check the emails about previous sales work during this period, which is unfavorable to the normal progress of the work.

SUMMARY

Technical Problems

An object of the present invention is to overcome the disadvantages of the prior art, and provide a method for a user/an employee in a system to acquire an email account. When a post (job) is allocated to the employee, a corresponding role-nature email account is allocated to him/her at the same time, without having to allocate a role-nature email account to the employee separately, thus reducing the workload of allocating email accounts.

Solutions to Problems

Technical Solutions

An object of the present invention is implemented by the following technical solutions. A method for a user/employee in a system to acquire an email account includes:

relating a role-nature email account to a role according to work content of the role in the system, wherein during the same period, one role can only be related to one role-nature email account, and one role-nature email account can only be related to one role; said role is an independent individual not a group/a class, and during the same period, one role can only be related to a unique user, and one user is related to one or more roles; and creating a relation between a user and a role, wherein for any user, role-nature email accounts related to all roles related to the user are used as role-nature email accounts of the user and/or an employee corresponding to the user. These two steps are not order-sensitive.

Preferably, after a role-nature email account is related to a role, the role-nature email account related to the role cannot be replaced; or, after a role-nature email account is related to a role and the role-nature email account is put into use, the role-nature email account related to the role cannot be replaced.

Preferably, when a role-nature email account of a user needs to be replaced, the relation of the role to the original role-nature email account is cancelled, and the role is related to a new role-nature email account.

Preferably, said role-nature email account is an email account of a mailbox application in said system or an email account of a mailbox service provided by a third party.

Preferably, the method for a user/an employee in a system to acquire an email account further includes: selecting one or more roles as supervising roles, and setting a supervised role for each supervising role respectively, so that a user related to the supervising role or an employee corresponding to the user can operate role-nature email accounts related to all supervised roles corresponding to the supervising role.

Preferably, the method for a user/an employee in a system to acquire an email account further includes: relating an individual-nature email account to a user/an employee, wherein during the same period, one user/one employee can only be related to one individual-nature email account, and one individual-nature email account can only be related to one user/one employee.

Preferably, after an individual-nature email account is related to a user/an employee and the individual-nature email account related to the user/employee cannot be replaced; or, after an individual-nature email account is related to a user/an employee and the individual-nature email account is put into use, the individual-nature email account related to the user/employee cannot be replaced.

Preferably, when an individual-nature email account is related to a user, the individual-nature email account related to the user is acquired as an individual-nature email account of an employee corresponding to the user.

Preferably, when an individual-nature email account is related to an employee, the individual-nature email account related to the employee is acquired as an individual-nature email account of a user corresponding to the employee.

Preferably, the method for a user/an employee in a system to acquire an email account further includes: selecting one or more roles as supervising roles, and setting a supervised role for each supervising role respectively, so that: a user related to the supervising role or an employee corresponding to the user can operate individual-nature email accounts of a user related to all supervised roles corresponding to the supervising role; or a user related to the supervising role or an employee corresponding to the user can operate individual-nature email accounts of an employee corresponding to a user related to all supervised roles corresponding to the supervising role.

Beneficial Effects of the Invention

Beneficial Effects

The present invention has the following beneficial effects: (1) According to the present invention, a role-nature email account is related to each role, and a corresponding role-nature email account is allocated to an employee while a post number or job is allocated to the employee at the same time, without having to allocate a role-nature email account to the employee separately. No hysteresis of allocating the role-nature email account occurs in the case of resignation, job transfer, recruitment, and the like, thus reducing the workload of allocating email accounts.

For example, after the user corresponding to an employee A is related to a role A and a role B, the role-nature email accounts related to the role A and the role B are automatically allocated to the employee A, without having to separately allocate an email account to the employee A.

(2) After an employee is transferred from a post or resigned, the role-nature email account related to the role, which needs to be allocated to another employee, will not be allocated to an employee who does not undertake work content of the role, thus preventing the emails in the email account from being leaked to unrelated persons while the email account is transferred to another user.

For example, the user corresponding to an employee A is related to both a role of an appliance salesperson 1 and a role of a software salesperson 1. Since the employee A has resigned (when the employee A resigns, both the role of the appliance salesperson 1 and the role of the software salesperson 1 are released from the relation to the user corresponding to the employee A, and therefore, the employee A or a user corresponding to the employee A automatically loses the permission of using "the role-nature email account related to the appliance salesperson 1 and the role-nature email account related to the software salesperson 1"), the appliance salesperson 1 is related to a user corresponding to an employee B (the employee B acquires the role-nature email account related to the appliance salesperson 1), and the software salesperson 1 is related to a user corresponding to an employee C (the employee C acquires the role-nature email account related to the software salesperson 1). In this way, the employee B can only check and receive the emails about appliance sales, but cannot check or receive the emails about software sales. Similarly, the employee C can only check and receive the emails about software sales, but cannot check and receive the emails about appliance sales.

(3) In the present invention, a role is related to a role-nature email account according to the work content, so that an email sender does not need to worry about whether the emails sent to a role-nature email account are leaked to unrelated persons, because the current user of the role-nature email account is surely in charge of the relevant work currently.

For example, the work content of a role A is attendance statistics, and the role A is related to an email account A. Therefore, after the role A is related to the user corresponding to the employee A, the employee A becomes a current user of the email account A, and the current work content of the employee A surely includes attendance statistics. After an email sender sends an attendance-related email to the email account A, the attendance-related email will be invisible to any unrelated person.

(4) After a role is related to a role-nature email account, the role-nature email account related to the role cannot be replaced. In this way, all the emails related to the work content of the role are sent to the same email account, without the need to worry about whether the email account is changed midway.

For example, if the role A is related to the email account A, the role A is unavailable for relating to other email accounts, and the email account A is unavailable for relating to other roles either.

(5) The user/employee corresponding to the supervising role operates the role-nature email account of the supervised role, for example, having one or more permissions of checking email content, sending an email, deleting an email, and the like, thereby facilitating a supervisor in supervising and managing the work of his/her subordinates or corresponding roles.

(6) An individual-nature email account is set for the user/employee to send and receive private information emails of the user/employee, thus separating job emails (a role-nature email account handles job emails) from private emails (an individual-nature email account handles private emails). Because the user/employee's individual-nature email account is never allocated to other employees/users, the user/employee does not need to worry about the leakage of private information caused by the handover of the email account after a job change.

For example, if an employee A is late for work but his/her supervisor refrains from deducting wages of the employee A in view of good business results of the employee A, the supervisor may explain this by sending an email to the individual-nature email account of the employee A, without worrying about a risk of bringing adverse effects on the company in consequence of leaking the email to a successor who takes over the work of the employee A after the employee A is resigned or transferred from a post.

(7) The conventional permission management mechanism defines the nature of a group, a type of work, a class or the like as the role. The role is in a one-to-many relation to the user. In the actual process of using a system, the user's permissions often need to be adjusted during the operation process. For example, in processing the change of employee's permissions, when the permissions of the employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in the loss to the system user.

However, under the method of the present application, as the role is an independent individual, the object can be achieved by changing the permissions of the role. Although the method in the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (after the permissions of the user/role have changed dynamically), the solutions in the present application can significantly improve the permission management efficiency for the system user in using the system, make the dynamic authorization simpler, more convenient, clearer and more explicit, and improve the efficiency and reliability of the permission setting.

(8) The conventional role authorization method with the nature of a group is prone to errors. The method provided in the present application significantly reduces the probability of authorization errors, because the method of the present application only needs to consider the role as an independent individual, without considering the commonality of multiple users related to the role having the nature of a group under the conventional method. Even if errors occur in authorization, only the user related to the role is affected. However, in the case of the conventional role having the nature of a group, all users related to the role are affected. Even if errors occur in authorization, the correction method in the present application is simple and takes a short time, while in the case of the conventional role having the nature of a group, the commonality of the permissions of all users related to the role needs to be considered during correcting the error. The modification is cumbersome, complex, and error-prone when there are many function points, and in many cases, the problem cannot be solved unless a new role is created.

(9) In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a station number, such that the selection can be made easily.

(10) When a user is transferred from a post, if many permissions of the transferred user need to be assigned to other users, in processing, it is necessary to distinguish the permissions of the transferred user and create roles to be related to other users respectively. The operations are complicated, time-consuming, and prone to errors.

The method in the present application is as follows: The transferred user is related to several roles. When the user is transferred, the relation between the user and the roles in the original department is first canceled (the canceled roles may be re-related to other users), and then the user is related to a role in a new department. The operation is simple and not error-prone.

(11) When or after a role is created, a department needs to be selected. Once the department is selected for the role, the department cannot be replaced. Reasons why the department to which the role belongs cannot be replaced are as follows. Reason 1: As the role in the present application is equivalent to a station number/a post number in nature, different station numbers/post numbers have different work content or permissions. For example, the role of a salesperson 1 under a sales department and the role of a developer 1 under a technical department have two completely different station numbers or post numbers, and have different permissions. Reason 2: If the department (sales department) to which the role of the salesperson 1 belongs is replaced by the technical department without changing the permissions of the role of the salesperson 1, the role that owns the permissions of the sales department exists in the technical department. This leads to management confusion and security vulnerabilities.

BRIEF DESCRIPTION OF THE DRAWINGS

Description of Drawings

Figure 1:
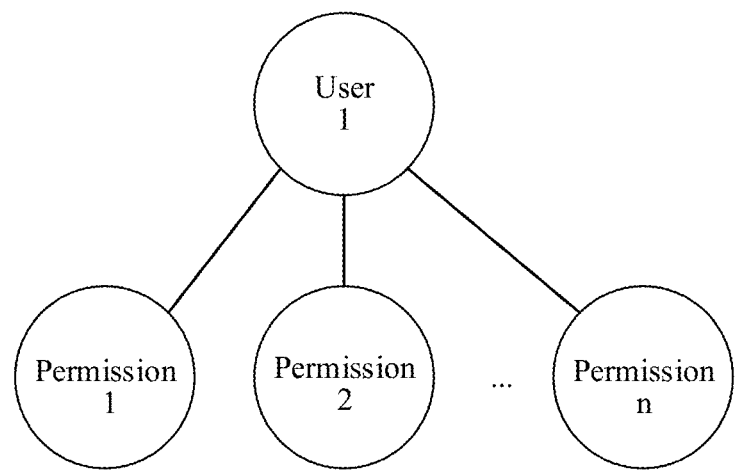
Figure 2:
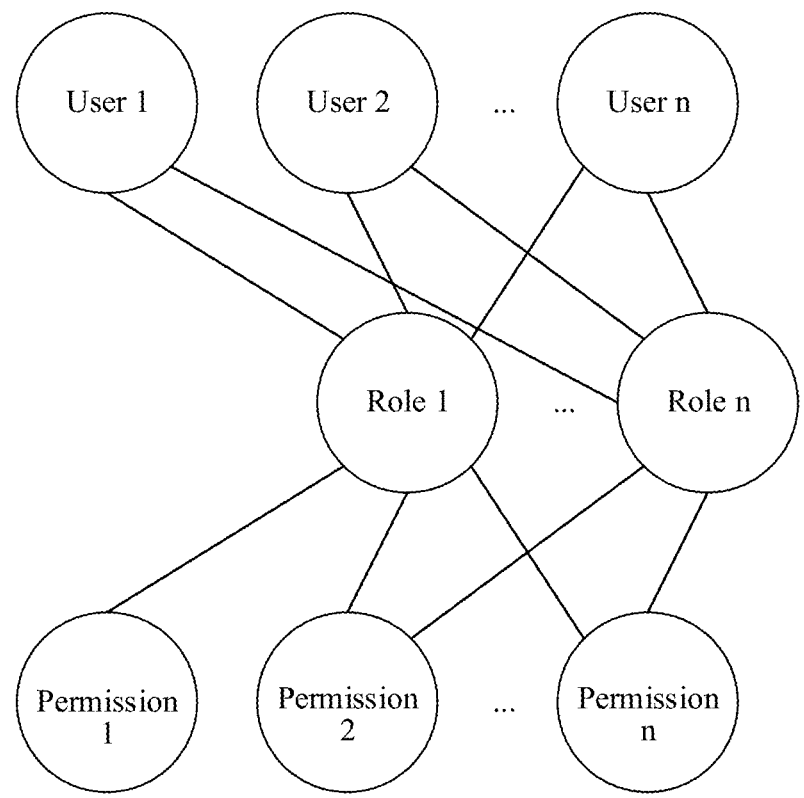
Figure 3:
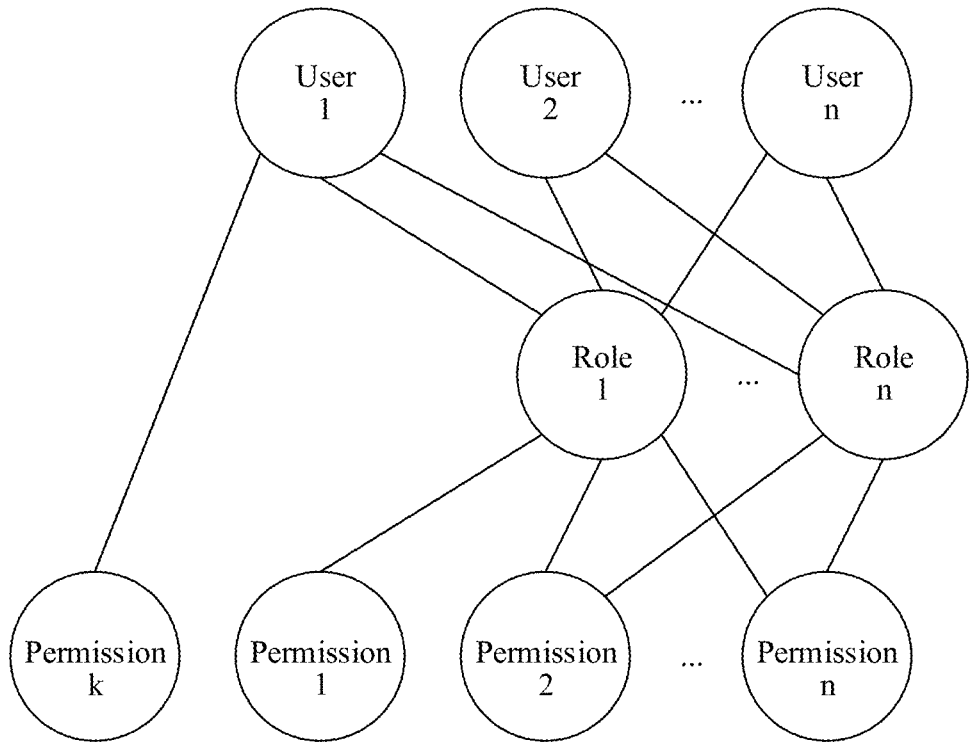
Figure 4:
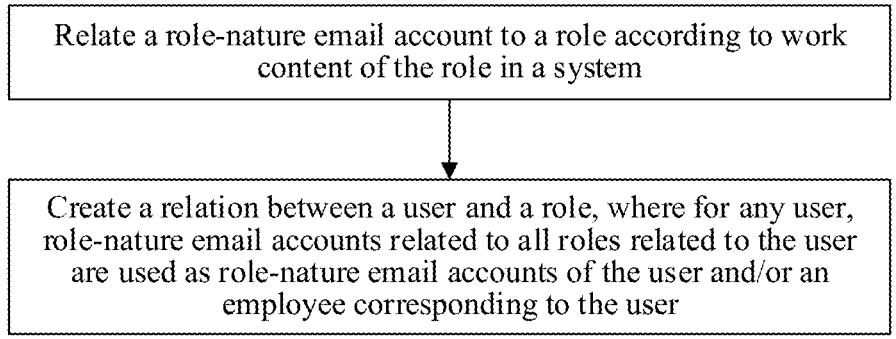

FIG. 1 is a schematic diagram in which a user is directly authorized in the prior art;

FIG. 2 is a schematic diagram in which a role having the nature of a group/a class is authorized in the prior art;

FIG. 3 is a schematic diagram in which directly authorizing a user is combined with authorizing a role having the nature of a group/a class in the prior art;

FIG. 4 is a schematic flowchart of an embodiment in the present invention; and

Figure 5:
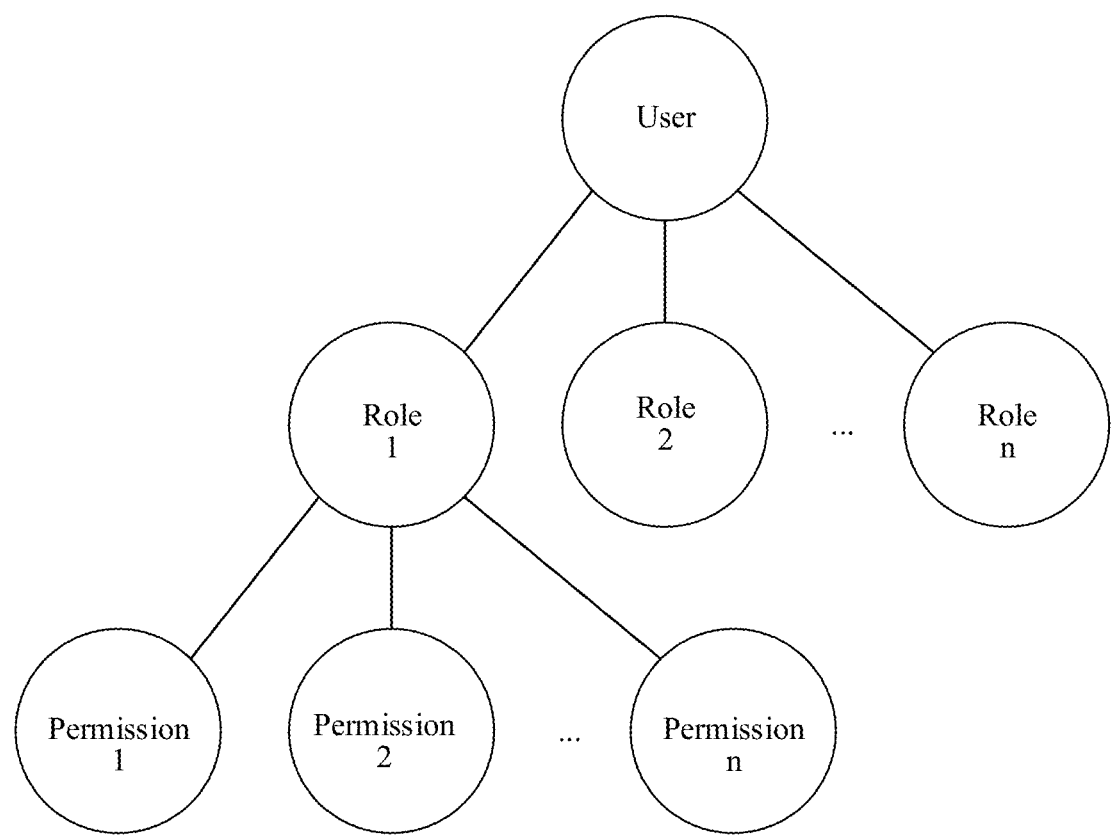

FIG. 5 is a schematic diagram in which a user is authorized through a role having the nature of an independent individual according to the present invention.

DETAILED DESCRIPTION

Description of Embodiments

The technical solutions of the present invention will be further described in detail below with reference to the figures, but the protection scope of the present invention is not limited to the following descriptions.

As shown in FIG. 4, a method for a user/an employee in a system to acquire an email account includes: Step 1: relating a role-nature email account to a role according to work content of the role in the system (for a role, this step may be further understood as: relating an email account to a role according to work content of the role in the system, and using the email account as a role-nature email account of the role), wherein during the same period, one role can only be related to one role-nature email account, and one role-nature email account can only be related to one role.

The role-nature email account is an email account having the nature of a post number/a station number. That is, one role-nature email account corresponds to one post number/station number, and one post number/station number corresponds to one role-nature email account.

In this embodiment, the role-nature email account related to the role falls in two circumstances: replaceable and unreplaceable, which are described in detail below. Firstly, the role-nature email account related to the role is unreplaceable. That is, after a role-nature email account is related to a role, the role-nature email account related to the role cannot be replaced; or, after a role-nature email account is related to a role and the role-nature email account is put into use, the role-nature email account related to the role cannot be replaced. Even after a role is suspended, the role-nature email account related to the role still cannot be related to other roles, but a user related to a supervising role corresponding to the role or an employee corresponding to the user can still operate the role-nature email account. Secondly, the role-nature email account related to the role is replaceable. When a role-nature email account of a user needs to be replaced, it is only necessary to cancel the relation of the role to the original role-nature email account, and relate the role to a new role-nature email account.

The role-nature email account comes from one or two of the following sources: 1. The role-nature email account is an email account of an email application (software) in the system (that is, an email account in the system). In this case, the method further includes a step of creating an email account/role-nature email account. 2. The role-nature email account is an email account from an email service provided by a third party, such as a Netease email account, a QQ email account, or the like.

As shown in FIG. 5, the role is an independent individual not a group/a class. During the same period, one role can only be related to a unique user, while one user is related to one or more roles. The user acquires permissions of the related role. When or after the role is created, a department is selected for the role, so that the role belongs to the department. The role is authorized according to its work content, the name of the role is unique in the department, and the number of the role is unique in the system.

Definition of a role: A role does not have the nature of a group/a class/a category/a post/a position/a type of work or the like, but has non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San (the system creates a Zhang San user for Zhang San), the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/a station number, and is also similar to the role in a film and television drama: one role (in childhood, juvenile, middle-age . . . ) can be played by only one actor or actress during the same period, but one actor or actress may play multiple roles.

When a user is transferred across the departments, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

One employee corresponds to one user, one user corresponds to one employee, and an employee determines (acquires) permissions based on the role related to the user corresponding to the employee. An employee is bound to a user for life. After a user corresponds to an employee, the user belongs to the employee, and the user cannot be related to other employees. If the employee resigns, the user cannot correspond to other employees. After the employee is re-recruited, the employee still corresponds to the original user.

The method further includes Step 2: creating a relation between a user and a role, wherein for any user, role-nature email accounts related to all roles related to the user are used as role-nature email accounts of the user and/or an employee corresponding to the user.

When an email is received/sent, one or more types of the information such as the user who receives/sends the email, the employee who receives/sends the email, the role who receives/sends the email, and the time of receiving/sending the email are recorded and displayed, thus facilitating the future check on which employee, which role, and which user receives/sends the email and when the email is received/sent.

The method for a user/an employee in a system to acquire an email account further includes: selecting one or more roles as supervising roles, and setting a supervised role for each supervising role respectively, so that a user related to the supervising role or an employee corresponding to the user can operate role-nature email accounts related to all supervised roles corresponding to the supervising role. The operations performed by the user related to the supervising role or by the employee corresponding to the user on the role-nature email account related to the supervised role include one or more of: checking email content, deleting an email, sending an email and the like. If a checked email is never checked by a user related to a supervised role and an employee corresponding to the user, the checked email is still displayed as an unchecked state after being checked by the user related to the supervising role or the employee corresponding to the user. In addition, after the user related to the supervising role or the employee corresponding to the user operates the role-nature email account related to the supervised role, the role-nature email account records and displays information on operations performed by a person other than the user/employee. For example, the information includes one or more of: the supervising role who performs the operation, the user related to the supervising role, the employee corresponding to the user, the operation time, the specific operation content and the like.

The method for a user/an employee in a system to acquire an email account further includes: relating an individual-nature email account to a user/an employee (for a user/an employee, this step can be further understood as: relating an email account to the user/employee to serve as an individual-nature email account of the user/employee), wherein during the same period, one user/one employee can only be related to one individual-nature email account, and one individual-nature email account can only be related to one user/one employee.

After the employee resigns, the individual-nature email account related to the employee and to the user corresponding to the employee will be suspended, that is, the individual-nature email account will not be allocated to another employee/user either, thus preventing leaking the email content in the individual-nature email account. However, if authorized, the supervisor of the employee can still operate the individual-nature email account. If the employee is re-employed by the company after resignation, the original individual-nature email account of the employee is automatically re-allocated to the employee/the user corresponding to the employee (once the individual-nature email account is related to the user, the relation is always sustained and unreplaceable; once the individual-nature email account is related to the employee, the relation is always sustained and unreplaceable).

When sending emails, a job-related email is sent through a corresponding role-nature email account, and a non-job-related email is sent through an individual-nature email account. By setting an individual-nature email account for the user/employee to receive non-work emails, work emails are separated from non-work emails, thus facilitating protection of personal private information.

After an individual-nature email account is related to a user/an employee, the individual-nature email account related to the user/employee cannot be replaced; or, after an individual-nature email account is related to a user/an employee and the individual-nature email account is put into use, the individual-nature email account related to the user/employee cannot be replaced.

When an individual-nature email account is related to a user, the individual-nature email account related to the user is acquired as an individual-nature email account of an employee corresponding to the user. When an individual-nature email account is related to an employee, the individual-nature email account related to the employee is acquired as an individual-nature email account of a user corresponding to the employee.

The individual-nature email account comes from one or two of the following sources: 1. The individual-nature email account is an email account of an email application (software) in the system (that is, an email account in the system). In this case, the method further includes a step of creating an email account/individual-nature email account. 2. The individual-nature email account is an email account from an email service provided by a third party, such as a Netease email account, a QQ email account, or the like.

The method for a user/an employee in a system to acquire an email account further includes: selecting one or more roles as supervising roles, and setting a supervised role for each supervising role respectively, so that: a user related to the supervising role or an employee corresponding to the user can operate individual-nature email accounts of a user related to all supervised roles corresponding to the supervising role; or a user related to the supervising role or an employee corresponding to the user can operate individual-nature email accounts of an employee corresponding to a user related to all supervised roles corresponding to the supervising role.

The above is only a preferred embodiment of the present invention, and it should be understood that the present invention is not limited to the forms disclosed herein, and is not to be construed as being limited to the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. A method for a user to acquire an email account in a management computer system, comprising:
    relating a role-nature email account to a role according to work content of the role in the system, wherein during a same period, the role is configured to be related to the role-nature email account only, and the role-nature email account is configured to be related to the role only, wherein the role is independent which is not a group or a class;
    relating a user to the role, during the same period, the role is configured to be related to a user only, while the user is configured to related to the role or more roles; and
    acquiring by the user the role-nature email account of the role or the role-nature email accounts of roles related to the user.

2. The method according to claim 1, wherein after the role-nature email account is related to the role, the role-nature email account related to the role cannot be replaced; or
    after the role-nature email account is related to the role and the role-nature email account is put into use, the role-nature email account related to the role cannot be replaced.

3. The method according to claim 1, wherein when the role-nature email account of the user needs to be replaced, the relation of the role to the role-nature email account is configured to be cancelled, and the role is configured to be related to a new role-nature email account.

4. The method according to claim 1, wherein the role-nature email account is an email account of a mailbox application in said system or an email account of a mailbox service provided by a third party.

5. The method according to claim 1, further comprising: selecting one or more roles as supervising roles, and setting a supervised role for each supervising role respectively, wherein a user related to the supervising role or an employee corresponding to the user is configured to operate the role-nature email accounts related to all supervised roles corresponding to the supervising role.

6. The method according to claim 1, further comprising: relating an individual-nature email account to the user, wherein during the same period, the user is configured to be related to the individual-nature email account, and the individual-nature email account is configured to be related to the user only.

7. The method according to claim 6, wherein after the individual-nature email account is related to the user, the individual-nature email account related to the user cannot be replaced; or
    after the individual-nature email account is related to the user and the individual-nature email account is put into use, the individual-nature email account related to the user cannot be replaced.

8. The method according to claim 6, wherein when the individual-nature email account is related to the user, the individual-nature email account related to the user is acquired as an individual-nature email account of an employee corresponding to the user.

9. The method according to claim 6, wherein when an individual-nature email account is related to an employee, the individual-nature email account related to the employee is acquired as an individual-nature email account of a user corresponding to the employee.

10. The method according to claim 6, further comprising: selecting one or more roles as supervising roles, and setting a supervised role for each supervising role respectively, wherein a user related to the supervising role or an employee corresponding to the user is configured to operate the individual-nature email accounts of a user related to all supervised roles corresponding to the supervising role; or a user related to the supervising role or an employee corresponding to the user is configured to operate the individual-nature email accounts of an employee corresponding to a user related to all supervised roles corresponding to the supervising role.

* * * * *